United States Patent Office 3,042,059
Patented July 3, 1962

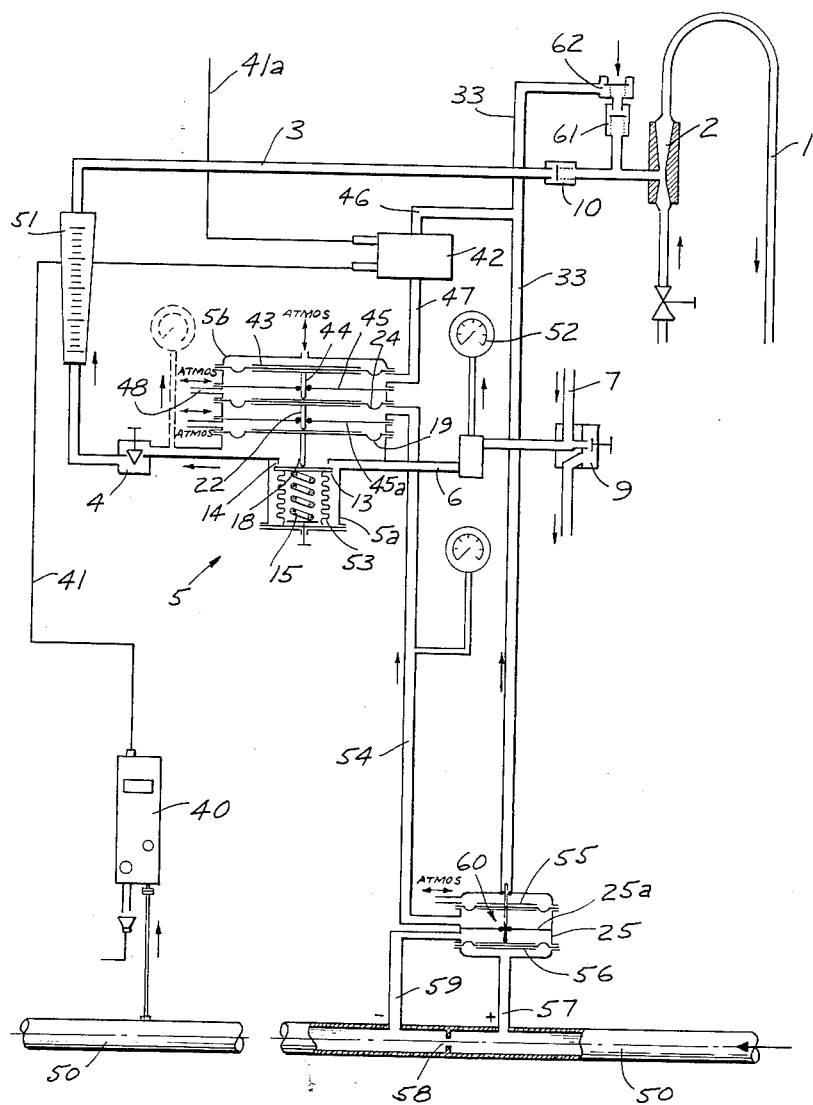

3,042,059
QUANTITY AND QUALITY CONTROLLED CHLORINATING INSTALLATION
Karl-Heinz Arenhold, Karlsruhe-Durlach, Germany, assignor to Chlorator G.m.b.H., Grotzingen, Karlsruhe, Germany, a German company
Filed June 28, 1960, Ser. No. 39,305
Claims priority, application Germany July 4, 1959
7 Claims. (Cl. 137—89)

The present invention relates to an installation for mixing chlorine and water, and more particularly to an installation in which the quantity of the admixed chlorine is made dependent upon all changes in the flow and the quantity of the water to be treated.

In installations of the general kind above referred to, it is known to provide an instrument which is responsive to the excess of chlorine in the water to be treated. The instrument generates an electromotive force in correspondence with changes in the quality of water to be supervised and the magnitude of the generated E.M.F. is utilized to control the addition of chlorine.

It is generally desirable to maintain the addition of chlorine as constant as possible for a given volume of water. To attain this purpose the addition of chlorine should be rapidly and continually conformed to any changes in the water flow as to volume or quantity. Instruments supervising the excess of chlorine as hereinbefore mentioned, have inherently an appreciable reaction time and accordingly they do not respond with the desired speed and accuracy, especially when changes in quality and quantity simultaneously occur.

There are also known installations in which the addition of chlorine is supervised by the aforementioned chlorine excess measuring instrument and also a control device which controls the addition of chlorine in accordance with the flow rate of the water to be treated. In installations of this kind a by-pass flow is branched off from the water main. The by-pass flow is supervised by a measuring instrument measuring the quality of the water and the measured quality is then compared with a standard quality. A further control device detects the flow rate of water in the water main and sends corresponding signals to a dosing device which receives signals also from the quality measuring instrument as to the addition of chlorine required for the detected quality of the water. The signals representing the quality and the quantity respectively of the water, control jointly the dosing valve. The chlorine is injected into the by-pass by means of an injector and the by-pass carrying the treated water is returned into the main at a point down-stream of the aforementioned two check points.

Theoretically, an installation of the aforedescribed kind should be entirely reliable, since the dosing with chlorine is controlled by the quality and the quantity of the water and the quantity of the chlorine to be added is ascertained prior to the admixture thereof from signals supplied by the quality and the quantity measuring instruments, respectively. However, extensive tests and theoretic considerations show that installations of the aforedescribed kind do not work accurately in practice, primarily due to the fact that changes in the addition of the quantity of the chlorine are not possible after the quantity of chlorine called for by the signals has been added. In other words, while the addition of the chlorine to the water is controlled by signals derived from the water, the actual result of the admixture, that is the quality of the treated water cannot be supervised. The signal responsive control devices are rather complex and delicate and if these instruments, due to some defect or misadjustment, make a mistake in the dosing, a quantity of chlorine in accordance with the faulty indication is added to the water and the control devices which probe the water prior to any admixture of chlorine cannot detect such faulty admixture and hence no corrections will be made.

It is a broad object of the invention to provide a novel and improved installation of the general kind above referred to, in which the quantity of the added chlorine is rapidly and accurately controlled in accordance with the rate of flow and the quality of the water to be treated.

A more specific object of the invention is to provide a novel and improved installation which is simple in its overall design, reliable in operation and can be conveniently assembled from component parts and sub-assemblies.

Another more specific object of the invention is to provide a novel and improved installation in which variations of the pressure of the available chlorine supply do not affect the accuracy of the dosing of the chlorine. Such variations are in practice unavoidable due to the depletion of the chlorine supply and changes in the ambient temperature.

Still another more specific object of the invention is to provide a novel and improved installation, the component parts and sub-assemblies of which can be installed physically remote from each other. This affords the advantage that each component may be placed in a position most convenient for its function.

A further object of the invention is to provide a novel and improved installation which requires for the operation of all its parts and sub-assemblies only a comparatively low vacuum.

The aforepointed out objects, features and advantages of the invention and other objects, features and advantages which will be pointed out hereinafter, are attained by providing an installation for admixing chlorine to water in which an injector sucks the chlorine from a preferably chlorine pressure independent dosing device. This dosing device doses the addition of chlorine in accordance with the quantity and the quality of the water to be treated. A control device responsive to the chlorine excess constituting part of the installation, are so arranged that the chlorine responsive instrument probes the flow of water in the main after mixing with chlorine and that the flow responsive device measures the rate of flow in the main. Both instruments generate signals in accordance with the detected chlorine excess and flow rate, respectively, and these signals are used to control the dosing devices. By arranging the chlorine excess responsive instrument downstream of the point at which the chlorine is added to the water main, the instrument measures the actually existing condition of the supervised water and it has been found that the quality and the quantity of the water representing cumulative signals fed to the dosing device result in a highly satisfactory accuracy of the chlorine control. Furthermore, the installation of the invention obviates the need for prechlorinating a partial volume of water for a subsequent adjustment of the main volume of water by complicated conversion means.

In the single FIGURE of the accompanying drawing a prefered embodiment of the invention is shown by way of illustration and not by way of limitation.

Referring now to the figure in detail, only those parts of the installation which are essential for the understanding of the invention, are shown.

The water to be treated flows through a water main 50. Treatment of the water by the controlled admixture of chlorine is effected in a by-pass 1, which should be visualized as being branched off from the water main and returned into the same. An injector 2, preferably of the venturi type, is included in by-pass 1. The injector builds up, due to the flow of water through by-pass 1, a vacuum in a suction pipe 3 connected to the throat of the injector. A one-way valve 10 prevents the ingress of water into suction pipe 3 and the herinafter described vacuum controlled assemblies connected thereto. Pipe 3 is connected through an instrument 51 which measures the flow of chlorine through pipe 3, such as an instrument of the rota-meter type, and a valve 4 for regulating the vacuum pressure produced in pipe 3 by injector 2, to the output side of vacuum dosing valve generally designated by 5. The chlorine input side of valve 5 is connected by pipes 6 and 7 to a supply of chlorine under pressure which should be visualized as being in the form of a conventional pressure bottle. The chlorine is supplied to valve 5 in gaseous form. A valve 9 serves to permit the escape of residual chlorine gas remaining in the installation after the installation has been shut down. A manometer 52 is connected to pipes 6 and 7 to indicate the chlorine supply. Valve 5 controls the volume of chlorine sucked from pipe 6 into pipe 3 and fed into by-pass 1 by means of a valve opening 14 provided between a lower housing portion 5a and an upper housing portion 5b of valve 5. The flow opening through the valve is controlled by a valve disc 13 which is urged by a loaded compression spring 15 into its closing position in reference to valve opening 14. The chlorine is fed through pipe 6 into housing portion 5a and the chlorine pressure acting upon disc 13 in the closing direction thereof is compensated by means of a bellows 53 mounted within housing portion 5a between disc 13 and the bottom of the housing portion whereby the closing force acting upon disc 13 is supplied by spring 15 only. The pressure balancing arrangement by the action of bellows 53 is more fully described in my copending application entitled "Pressure Reduction Valve," Serial No. 39,358 filed June 28, 1960.

Housing portion 5b is divided by partition walls 45 and 45a into three compartments. Each compartment is divided by respective peripherally supported diaphragms 19, 24 and 43 into an upper and lower chamber. The lowermost diaphragm 19 mounts a depending pin 18 which abuts against disc 13 on the side thereof opposite to that upon which spring 15 acts. A second pin 22 mounted on diaphragm 24 abuts against the top side of diaphragm 19 and a third pin 44 mounted on the diaphragm 43 abuts against the top side of diaphragm 24. As is evident, the pressure which pin 18 exerts upon disc 13 in the opening direction thereof and against the opposing pressure of spring 15, is a function of the combined flexing of the three diaphragms.

The upper chamber in the lowermost compartment is open to the atmosphere as shown and the pressure in the lower chamber of the compartment is in accordance with the vacuum in pipe 3 as set by valve 4. Accordingly, the flexing of diaphragm 19 is controlled by the pressure differential between the atmospheric pressure in the upper chamber of the lowermost compartment and the vacuum in the lower chamber.

The upper chamber in the intermediate compartment is open to the atmosphere and the pressure in the lower chamber of the compartment is controlled by a control valve 25 to which the chamber is connected by a pipe 54.

Valve 25 is divided by a partition wall 25a into an upper and a lower compartment. Each compartment is divided by a peripherally mounted diaphragm 55 and 56, respectively, into an upper and a lower chamber. The lower chamber of the lower compartment is connected by a conduit 57 up-stream of a constriction 58 in water main 50 and the upper chamber of the lower compartment is connected by a conduit 59 down-stream of constriction 58. The constriction causes a pressure drop in the main across the constriction and the magnitude of this pressure drop is indicative of the rate of flow through the water main. Accordingly, the pressure differential between the chambers of the lower compartment of valve 25 and with it the flexing of diaphragm 56 are indicative of the flow of water through main 50. The upper chamber of the upper compartment of valve 25 is open to the atmosphere and the lower chamber is connected to the aforementioned pipe 54.

Valve 25 further comprises an auxiliary valve generally designated 60. Control valve 25, its auxiliary valve and the action of valve 25 upon dosing valve 5 are more fully described and illustrated in my copending application entitled "Quantity Controlled Chlorinating Installation," Serial No. 39,365 filed June 28, 1960. It suffices to state in this application that the auxiliary valve in one position connects the lower chamber of the upper compartment to the atmosphere in the upper chamber of the same compartment and in another position to a pipe 33 which is connected to the suction pipe 3 and hence participates in the vacuum built up in pipe 3 by the action of injector 2. The connection between pipes 33 and 3 preferably includes a one-way valve 61 to prevent the ingress of water into the system and a vacuum breaker 62 in the form of a spring loaded valve disc. The purpose of vacuum breaker 62 is to prevent the build-up of an excessively high vacuum in the pipes which may cause damage to the rather delicate diaphragms.

The auxiliary valve 60 is fixedly coupled to diaphragms 55 and 56 so that the position of the valve is controlled by the flexing of these diaphragms which in turn is controlled by the volume of water flowing through main 50. As is evident, the pressure in the lower chamber of the upper compartment of valve 25 is transmitted to the respective chamber in valve 5 through pipe 54, and, accordingly, the resulting flexing of diaphragm 24 will exert a control action upon disc 13 which is superimposed upon the control action of diaphragm 19.

All the control assemblies heretofore described are also described in my aforesaid copending applications. The described assemblies effect a control of the addition of chlorine independent of variations of the chlorine supply pressure due to depletion of the chlorine supply and changes in the ambient temperature, and also in accordance with the rate of flow through the water main 50.

The present invention carries forward the supervision of the addition of chlorine to the water to be treated by detecting the quality of the water after the addition of the chlorine water mixture to the main through by-pass 1 and regulating the addition of chlorine to the by-pass in accordance with the detection of the treated water.

For this purpose a measuring instrument 40 for measuring the chlorine excess in the water is connected to the water main 50 at a point down-stream from the point at which by-pass 1 carrying the chlorine water mixture is returned into the main. The distance between the point of return of by-pass 1 and the point at which the instrument 40 is connected should be such that it allows for a complete reaction between the water in the main and the added chlorinated water, that is, the distance should be such that the water in the main has absorbed the added chlorine. Suitable chlorine excess measuring or detecting instruments are well known. They are extensively described in the literature and readily available in the market. The instrument 40 should be visualized as being of conventional design so that a more detailed description thereof is not necessary for the understanding of the invention.

The instrument generates an E.M.F. in accordance with the detected chlorine excess in main 50 and this E.M.F is fed to a pressure regulator 42. Regulator 42 is connected by a wire 41 to the measuring instrument 40 and through a wire 41a to ground or a power line. The regulator converts a vacuum transmitted to it through a pipe 46 connected to pipes 33 and 3 in accordance with the E.M.F. fed to the regulator and the adjusted vacuum is fed by a pipe 47 to the lower chamber of the uppermost compartment in dosing valve 5. Electro-pneumatic regulators of this type are well known in the art. They are described in the literature and readily available in the market.

As is now apparent, the vacuum in the lower chamber of the uppermost compartment of valve 5 is a function of the chlorine excess detected by instrument 40, and accordingly, the flexing of diaphragm 43 is controlled by the quality of the treated water as detected by instrument 40. The flexing of diaphragm 43 is transmitted to valve disc 13 through diaphragms 24 and 19 and pins 44, 22 and 18, thus superimposing the control signals produced by the instrument 40 upon the control signals produced by control valve 25 and the pressure differential in the lowermost compartment of valve 5.

The rather low E.M.F. generated by instrument 40 in accordance with the chlorine excess is amplified in the regulator 42 and converted in a corresponding vacuum. It is also compared with a standard value, and if necessary, the detected actual value of the chlorine excess is conformed to the desired value of chlorine by correspondingly changing the vacuum acting upon diaphragm 43.

As is evident, the flowing motions caused by the separate quantity detecting devices and quality detecting devices of the installation act cumulatively in response to simultaneous changes in the quantity of the water as detected by valve 25 and the quality of the water as detected by instrument 40. The superimposed controls influencing the position of disc 13 in the opening direction all coact to set the disc for producing the correct chlorine dosage.

Tests have shown that a vacuum of about 1,000 mm. of column of water is necessary to move the valve disc into its open position by the action of the diaphragms. More specifically, about 200 mm. are required for the control of diaphragm 19 which supplies the basic control signal; about 700 mm. for the operation of the diaphragm 24 which supplies the quantity control signal; and about 100 mm. for the control of diaphragm 43 which supplies the quality control signal.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An installation for admixing chlorine to water flowing through a bypass branched off from a water main and returned into the same, said installation comprising, in combination, a dosing valve assembly having an input side and an output side, a feed pipe for feeding chlorine under pressure to said dosing valve assembly connected to the input side thereof, a suction pipe adapted to be connected at one end to said bypass for suction action by the flow of water through the bypass and connected at the other end to the output of said dosing valve assembly, said assembly including a movable valve disk interposed between said suction pipe and said feed pipe to expose one side of the disk to a vacuum in the suction pipe and the other to chlorine pressure, the position of said valve disk controlling the flow of chlorine from the feed pipe into the suction pipe, a yieldable pressure means disposed on the chlorine pressure side of the disk and pressing the same toward a valve-closing position, a vacuum-controlled pressure means disposed on the chlorine side of the disk, said vacuum-controlled pressure means including a flexible diaphragm exposed to the vacuum in the suction pipe for flexing said diaphragm in accordance with said vacuum, and an actuating member coupled to the diaphragm and acting upon the disk to press the same toward a valve-opening position, the differential between the opposing pressures of the yieldable pressure means and the actuating member controlling the position of the disk, chlorine-sensitive control means adapted to be connected to said water main downstream from the return connection of said bypass to said main, said chlorine-sensitive means including means sensitive to and controlled by the chlorine content of the water, means connecting said chlorine-sensitive means to said dosing valve assembly to exert pressure upon the disk-actuating member thereof in the valve-opening direction in accordance with the chlorine content as detected by said chlorine-sensitive control means, and flow-sensitive valve control means adapted to be connected to said main, said flow-sensitive control means including a control means controlled by the rate of flow of water in said main and connected to said dosing valve assembly to exert pressure upon said disk-actuating member in the valve-opening direction in accordance with the rate of flow of water, whereby the total pressure exerted by said actuating member upon the disk is a composite function of the pressures produced by the vacuum-controlled pressure means, the chlorine-sensitive control means and the flow-sensitive control means.

2. An installation according to claim 1, wherein said dosing valve assembly comprises compensating means automatically compensating for variations in the pressure of the chlorine feed to said dosing valve assembly.

3. An installation according to claim 1, wherein said chlorine-sensitive control means comprise a measuring means generating an electromotive force in accordance with the chlorine content of the water flow through the main, and a pressure means controlled by said electromotive force and coacting with said actuating member of the dosing valve assembly for varying the chlorine flow control by said valve assembly in accordance with the generated electromotive force.

4. An installation according to claim 3, wherein said chlorine-dosing valve assembly comprises a housing including a valve opening communicating on one side with said chlorine feed pipe and on the other side with said suction pipe, said valve disk coacting with said valve opening to control the flow of chlorine therethrough, said yieldable pressure means being mounted in the housing on the chlorine pressure side of the disk and said vacuum-controlled pressure means being mounted in the housing on the vacuum side of the disk, and wherein a second flexible diaphragm is mounted in the housing coupled with said actuating member to control the same by flexing of the second diaphragm, said second diaphragm being exposed on one side to the prevailing atmospheric pressure in the housing, the other side of said second diaphragm defining a closed chamber in the housing, said pressure means of the chlorine-sensitive control means including a pipe connected to said chamber, the air pressure in said pipe being controlled by said electromotive force and controlling the pressure in said chamber, whereby the corresponding pressure differential on opposite sides of the second diaphragm controls the pressure exerted by said actuating member upon the disk.

5. An installation according to claim 4, wherein a third flexible diaphragm is mounted in the housing coupled with said actuating member to control the same by flexing the third diaphragm, said third diaphragm being exposed on one side to the prevailing atmospheric pressure in the housing, the other side of the third diaphragm defining a second closed chamber in the housing, and wherein said control means of the flow-sensitive control means comprise vacuum-controlled pressure means and a pipe connecting said vacuum-controlled pipe pressure means and said second chamber, said pressure means of the flow-sensitive control means being controlled by the rate of flow in said water main and controlling the air pressure in said pipe and thus the pressure in said second chamber, whereby the corresponding pressure differential on opposite sides of the third diaphragm further controls the pressure exerted by said actuating member upon the disk.

6. An installation according to claim 1, wherein said chlorine-sensitive control means comprise a measuring means generating an electromotive force in accordance with the chlorine content of the water, and a pressure means controlled by said electromotive force and connected to said actuating member of the dosing valve assembly, said measuring means being a self-contained subassembly adapted to be disposed separately from the dosing valve assembly and closely adjacent said water main.

7. An installation according to claim 1, wherein said flow-sensitive control means is a self-contained subassembly adapted to be disposed separately from the dosing valve assembly and closely adjacent said water main.

No references cited.